United States Patent
Chen et al.

(10) Patent No.: US 9,183,014 B2
(45) Date of Patent: Nov. 10, 2015

(54) ENABLING VIRTUAL CALLS IN A SIMD ENVIRONMENT

(75) Inventors: Wei-Yu Chen, Santa Clara, CA (US);
Guei-Yuan Lueh, San Jose, CA (US);
Subramaniam Maiyuran, Gold River, CA (US)

(73) Assignee: Intel Corporation, Santa Clara, CA (US)

( * ) Notice: Subject to any disclaimer, the term of this patent is extended or adjusted under 35 U.S.C. 154(b) by 765 days.

(21) Appl. No.: 13/028,574

(22) Filed: Feb. 16, 2011

(65) Prior Publication Data
US 2012/0210098 A1   Aug. 16, 2012

(51) Int. Cl.
G06F 15/80   (2006.01)
G06F 9/455   (2006.01)
G06F 9/30    (2006.01)
G06F 9/44    (2006.01)

(52) U.S. Cl.
CPC ............ *G06F 9/455* (2013.01); *G06F 9/30061* (2013.01); *G06F 9/443* (2013.01)

(58) Field of Classification Search
CPC .............................. G06F 9/443; G06F 9/30061
USPC .................................................. 712/242–243
See application file for complete search history.

(56) References Cited

U.S. PATENT DOCUMENTS

| | | |
|---|---|---|
| 6,917,586 B1 | 7/2005 | Mauger et al. |
| 7,761,697 B1 * | 7/2010 | Coon et al. ............... 712/233 |
| 2002/0083292 A1 | 6/2002 | Isomura et al. |
| 2004/0243993 A1 * | 12/2004 | Okonnen et al. ............ 717/168 |
| 2005/0283775 A1 | 12/2005 | Eichenberger et al. |
| 2008/0298680 A1 * | 12/2008 | Miller et al. ................ 382/168 |
| 2009/0113421 A1 | 4/2009 | Hamilton, II et al. |
| 2009/0240931 A1 * | 9/2009 | Coon et al. .................... 712/234 |

FOREIGN PATENT DOCUMENTS

WO   2012/112218 A1   8/2012

OTHER PUBLICATIONS

Hennessy and Patterson, Computer Architecture a Quantitative Approach, 1996, Morgan Kaufmann, Second editiion, 5 pages.*
Chen, Wei-Yu et al., "Enabling Virtual Calls in a SIMD Environment", International Search Report and Written Opinion received for PCT Application Serial No. PCT/US2011/066448, mailed May 30, 2012, 9 pages.
International Preliminary Report on Patentability received for PCT Patent Application No. PCT/US2011/066448, mailed on Aug. 29, 2013, 6 pages.

* cited by examiner

*Primary Examiner* — Andrew Caldwell
*Assistant Examiner* — Jyoti Metha
(74) *Attorney, Agent, or Firm* — Jordan IP Law, LLC

(57) ABSTRACT

Systems and methods of enabling virtual calls in a single instruction multiple data (SIMD) environment may involve detecting a virtual call of a function and using a single dispatch of the function to invoke the virtual call for two or more channels of the virtual call. In one example, it is determined that the two or more channels share a common target address and a single dispatch of the function is conducted with respect to the common target address. The process may be iterated for additional channels of the virtual call that share a common target address.

30 Claims, 4 Drawing Sheets

26

28  mov (1) f0.0 0x0 {NoMask}
    and (1) r5.0 emask 0xFF {NoMask}

30  loop_begin:
    fbl (1) r8.0 r5 {NoMask} cmp.f0.0.eq (1) r8.0 0xFFFFFFFF {NoMask}
42
    (f0.0) jmpi (1) loop_end
30
    mad (1) a0.0 r8.0 0x4 &r2 {NoMask}
32
    cmp.f0.0.eq (8) r2.0<8;8,1> r[a0.0]<0;1,0>

34  ┌─────────────────────────────────────────┐
    │ (f0.0) calla (8) r[a0.0]<0;1,0>         │
    │                                         │
    │ not (1) r20.0 f0.0 {NoMask}             │
36  └─────────────────────────────────────────┘
    and (1) r5.0 r5.0 r20.0 {NoMask} while (8) loop_begin

...
    Foo_A:
    ... //body of A::foo
    ret (8) r10
    Foo_B: ... //body of B::foo
    ret (8) r10

FIG. 3A

ENABLING VIRTUAL CALLS IN A SIMD ENVIRONMENT

BACKGROUND

Object-oriented languages such as C++ may support the virtualization of functions so that virtual calls to an invoked function are not determined until runtime. While virtual functions may be a well understood concept in a sequential context, it can be less clear how they might be efficiently implemented in a SIMD (single instruction multiple data) environment where each channel may dispatch to different code for the underlying function (e.g., multi-target SIMD calls). Indeed SIMD virtual calls may conventionally be either unsupported (e.g., DirectX from Microsoft may require all dispatch targets to be known at compile time), or if supported, inefficient because each channel may dispatch to its target function a sequential (e.g., SIMD1) fashion.

BRIEF DESCRIPTION OF THE DRAWINGS

The various advantages of the embodiments of the present invention will become apparent to one skilled in the art by reading the following specification and appended claims, and by referencing the following drawings, in which:

FIGS. 3A-3C are diagrams of examples of assembly code sequence listings according to an embodiment.

DETAILED DESCRIPTION

Embodiments may provide for a method of processing a virtual call in which a virtual call of a function is detected. A single dispatch of the function can be used to invoke the virtual call for two or more channels of the virtual call.

Embodiments can also include a computer readable storage medium including a set of instructions which, if executed by a processor, cause a computer to detect a virtual call of a function. In addition, the instructions may use a single dispatch of the function to invoke the virtual call for two or more channels of the virtual call.

Other embodiments may include a system including a main processor, a secondary processor coupled to the main processor, and a computer readable storage medium having a set of instructions which, if executed by the secondary processor, cause the system to detect a virtual call of a function. The instructions can also cause the system to use a single dispatch of the function to invoke the virtual call for two or more channels of the virtual call.

Figure 1:
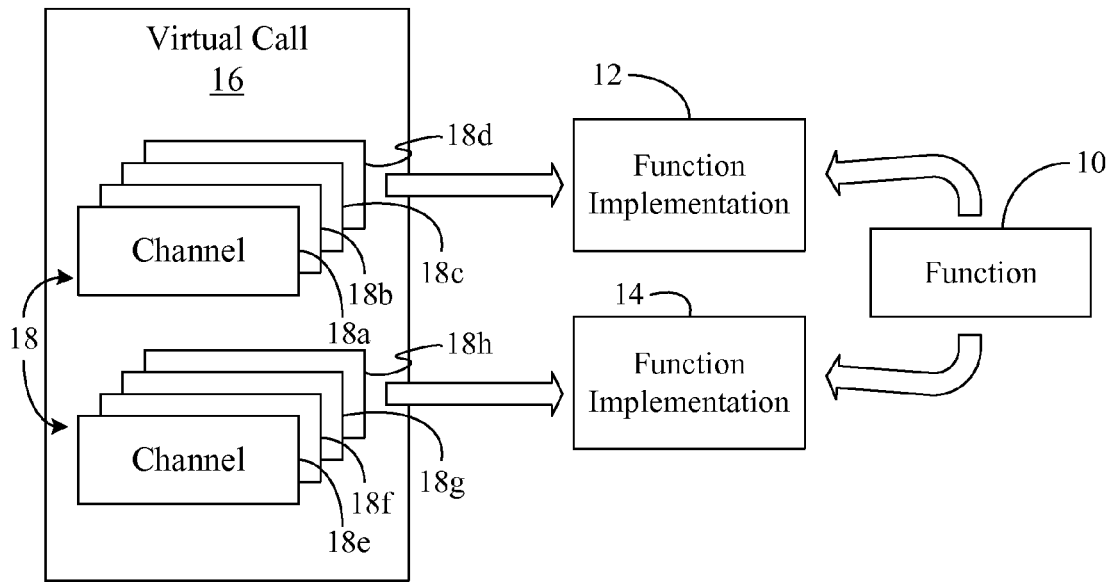
FIG. 1 is a block diagram of an example of a virtual call in a SIMD environment according to an embodiment.

Turning now to FIG. 1, a SIMD (single instruction multiple data) environment is shown in which a virtual call 16 from executing code invokes multiple implementations of a function 10 and the invocations are not determined until runtime. In the illustrated example, the function 10 is used in a first implementation 12 and a second implementation 14. In particular, the virtual call 16 may include multiple channels 18 (18a-18h) that invoke the function implementations 12, 14. In the illustrated example, a first subset of channels 18a-18d invoke the first implementation 12 of the function 10, and a second subset of channels 18e-18h invoke the second implementation 14 of the function 10. Thus, the virtual call 16 might be represented by the following C++ code sequence.

```
Class A {
    virtual void foo( ) {...} //A implementation
}
Class B : public A {
    virtual void foo( ) {...} // B implementation
}
int main( ) {
    A*obj;
    ...
    obj->foo( ); // may call either A::foo or B::foo
}
```

Where "foo" is the function 10, "A implementation" is the first implementation 12, "B implementation" is the second implementation 14 (and a subclass of the first implementation), and the variable "obj" is a channel-based vector variable. For example, if an eight channel SIMD (SIMD8) environment is deployed, there may be eight concurrent program flows and one instruction that operates on eight-element vectors. In this situation, the variable "obj" could be an eight-channel vector variable, and each channel 18 in the virtual call 16 may invoke either A's or B's implementation of the function foo( ). As will be discussed in greater detail, a single dispatch of the function 10 may be used to invoke the virtual call 16 for two or more of the channels 18. For example, one dispatch of the function 10 could be used to invoke the virtual call 16 for the first subset of channels 18a-18d, and another dispatch of the function 10 might be used to invoke the virtual call 16 for the second subset of channels 18e-18h.

Figure 2:
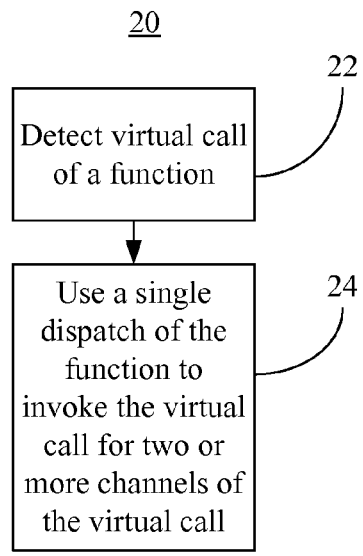
FIG. 2 is a flowchart of an example of a method of processing a virtual call of a function according to an embodiment.

FIG. 2 shows a method 20 of processing a virtual call in a SIMD environment. The method 20 may be implemented in executable software as a set of logic instructions stored in a machine- or computer-readable medium of a memory such as random access memory (RAM), read only memory (ROM), programmable ROM (PROM), firmware, flash memory, etc., in fixed-functionality hardware using assembly language programming and circuit technology such as application specific integrated circuit (ASIC), complementary metal oxide semiconductor (CMOS) or transistor-transistor logic (TTL) technology, or any combination thereof.

Processing block 22 provides for detecting a virtual call of a function. As already noted, the virtual call may be detected at runtime and the function may be implemented in different target locations of the user code. In addition, the virtual call may have a plurality of channels that can individually invoke any of the implementations of the function. Illustrated block 24 provides for using a single dispatch of the function to invoke the virtual call for two or more channels of the virtual call. Thus, the illustrated approach can be substantially more efficient than an approach in which each channel dispatches to its target function in a sequential SIMD1 fashion.

For example, in response to detecting the virtual call, a compiler may populate an address register (e.g., r2, to be discussed in greater detail) with function address (e.g., function body location) data associated with the virtual call. For example, to determine the addresses to be stored in the address register, the compiler might consult a virtual table (vtable), which is a lookup table of functions that can be used to resolve function calls in a dynamic/late binding manner. The single dispatch process of block 24 may involve determining that two or more channels of the virtual call share a common target address, and conducting the single dispatch of the function with respect to the common target address only.

For example, the address register might be used to determine that the target address associated with the first function implementation 12 (FIG. 1) is shared by the first subset of channels 18a-18d (FIG. 1). In such a case, a single dispatch of the function with respect to the target address of the first function implementation may be conducted, and a status register (e.g., r5, to be discussed in greater detail below) can be updated accordingly. The address register could then be used to determine that the target address associated with the second function implementation 14 (FIG. 1) is shared by the second subset of channels 18e-18h (FIG. 1). A single dispatch of the function may then be conducted with respect to the target address of the second function implementation, and the status register can again be updated. The process may be repeated so that the function invocation is performed exactly N times, where N is the number of distinct function addresses in the address register.

In one example, the virtual call can be represented as the following pseudo SIMD operation.

[(<pred>)] call (8) r2

Where r2.0-7 (bits zero through seven of address register r2) reference the eight function addresses and the call may be predicated. In particular, a predicated call can be a function call instruction that is guarded by a hardware predicate register (e.g., flag register f0, to be discussed in greater detail). If a certain bit of the predicate register is enabled, the call can be performed for that bit. Otherwise, the call instruction may be treated as a "no operation" instruction. Thus, the predicate register can be used to mask the invocation instruction and therefore conduct the single dispatch only for the common target address.

FIG. 3A shows an assembly code listing 26 for an approach to processing a virtual call of a function in a SIMD environment. Generally, an initialization portion 28 of the listing 26 may provide for initializing a status register (r5), and an identification portion 30 of the listing 26 can determine that two or more channels of the virtual call share a common target address based on the status register. A predicate portion 32 of the listing 26 may populate a flag register (f0) based on the two or more channels that share the common target address, and a dispatch portion 34 can mask an invocation instruction with the flag register in order to conduct a single dispatch of the function with respect to the common target address. An update portion 36 of the listing 26 may update the status register based on the single dispatch of the function. Finally, an exit portion 42 can provide for ending loop operation of the listing 26 when all channels have executed the virtual call.

Figure 3B:
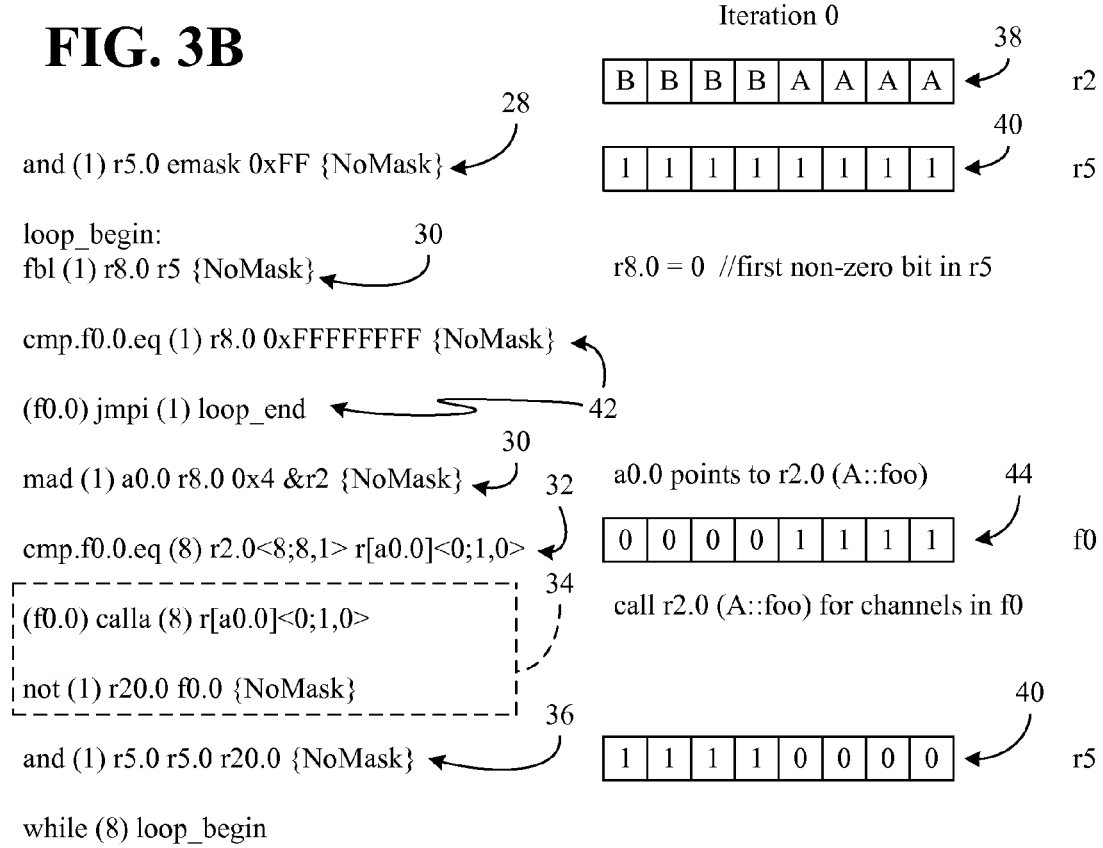
Figure 3C:
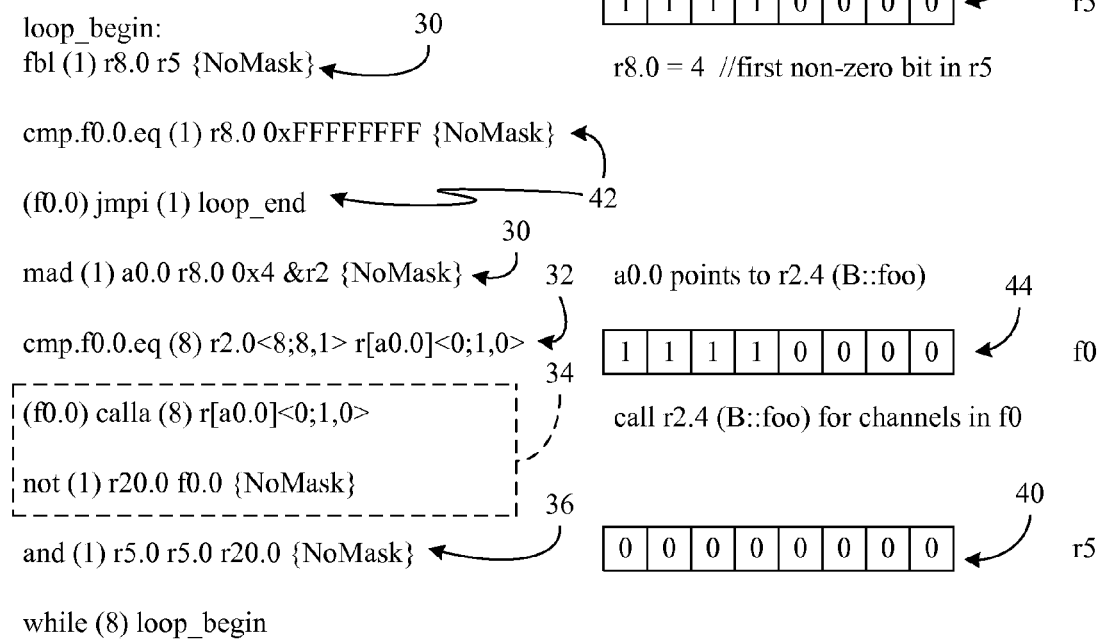

FIGS. 3B and 3C demonstrate operation of portions of the assembly code listing in multiple iterations for a case in which some channels invoke one implementation of a function and other channels invoke another implementation of the function. In particular, "Iteration 0" of FIG. 3B shows an address register (r2) 38 in which the lower four-bits of the address register indicate a target address of function implementation "A" (e.g., A::foo) and the higher four-bits of the address indicate a target address of function implementation "B" (e.g., B::foo). The lower eight-bits of a status register (r5) 40 store the channels that have not executed the virtual call. In the illustrated example, a value of "1" in the status register 40 indicates that the call is yet to be performed, and a value of "0" indicates either that the call has been executed or that the channel is inactive. Simply put, the illustrated initialization portion 28 uses the address register 38 to initialize the status register 40 to have the same value as the set of active channels at the program point of the virtual call, and as calls are made the status register 40 will be updated accordingly. The "NoMask" nomenclature provides for skipping a mask check for the operation in question and is specific to the Gen architecture from Intel Corporation, of Santa Clara, Calif.

At the beginning of loop operation, the identification portion 30 uses a first bit left (fbl) instruction to determine the first non-zero bit (from left to right) in the status register 40 and stores that value in a working register (r8). Thus, in the illustrated iteration, a value of zero is loaded into the working register to indicate that bit zero in the status register 40 is the first non-zero bit. Based on the value of the working register, the identification portion 30 can also use a multiply and add (mad) instruction to compute the location in the address register (one of r2.0 to r2.7) of the next function address yet to be called ("0x4" provides the size for each index into the register) and store the result to an intermediate parameter "a0.0". Thus, in the illustrated example, the intermediate parameter points to bit zero of the address register 38, which holds the target address of A::foo.

The predicate portion 32 may use a compare (cmp) instruction to populate a flag register (f0) 44 based on the channels that share the common target address. In particular, the compare instruction finds all channels that call the same function target as the channel returned by the fbl instruction, and stores the result in the flag register 44. Thus, in the illustrated example, the lower four bits of the flag register 44 are set to "1" and the higher four bits of the flag register 44 are set to "0".

The dispatch portion 34 can mask an invocation instruction such as a call absolute instruction (calla) based on the flag register 44 in order to conduct a single dispatch of the function with respect to the common target address. In particular, the intermediate parameter a0.0 provides the appropriate bit of the address register 38, and the flag register 44 ensures that only channels sharing the same target address are active inside the function body. Although the illustrated call absolute instruction uses absolute address data, other approaches may be used. For example, a branch divergent (brd) instruction could be used as the invocation instruction. In such a case, the dispatch portion 34 may include offset computation code to take into account relative address offset.

As already noted, the update portion 36 may update the status register 40 based on the single dispatch of the function. In the illustrated example, the lower four bits of the status register 40 are set to a value of "0" to indicate that the corresponding channels have invoked the virtual call. Thus, after the function returns, the illustrated approach avoids calling it twice for the same channels by setting the status register 40 to zero for the active channels in the call absolute instruction.

FIG. 3C shows the next iteration ("Iteration 1") of the above example. In the illustrated example, the first bit left instruction of the identification portion 30 stores a value of four in the working register, and the multiply and add instruction of the identification portion 30 causes the intermediate parameter a0.0 to point to bit four of the address register 38 (FIG. 3B), which holds the common target address of B::foo. Additionally, the compare instruction of the predicate portion 32 sets the lower four bits of the flag register 44 to "0" and the higher four bits of the flag register 44 to "1". The dispatch portion 34 masks the call absolute instruction with the flag register 44 in order to conduct a single dispatch of the function with respect to the common target address, B::foo. At the end of the iteration, all bits of the illustrated status register 40 are set to zero.

On the next iteration (not shown), the first bit left instruction of the identification portion 30 will return a value of "−1" due to all bits in the status register being set to zero. In addition, a compare instruction (cmp) of the exit portion 42 is used to determine that all channels have invoked the virtual call and, accordingly, store all zeroes into the flag register. The illustrated exit portion 42 will also use a jump indexed (jmpi) instruction to end the loop operation based on the value of the flag register. In the above assembly code discussion, it is assumed that a calling convention is in place and argument passing code is therefore not shown.

Figure 4:
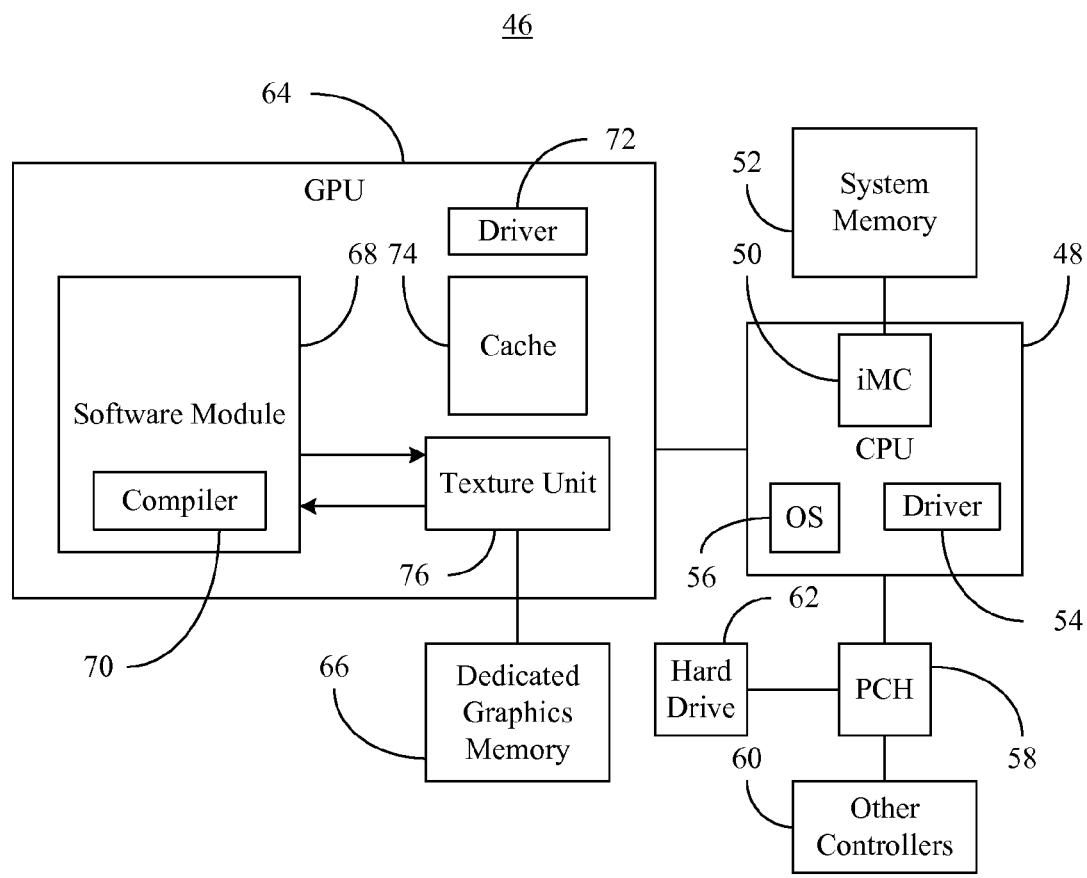
FIG. 4 is a block diagram of an example of a computing system according to an embodiment.

Turning now to FIG. 4, a computing system 46 is shown, wherein the system 46 may be part of a mobile platform such as a laptop, personal digital assistant (PDA), wireless smart phone, media player, imaging device, mobile Internet device (MID), etc., or any combination thereof. The system 46 may also be part of a fixed platform such as a personal computer (PC), server, workstation, etc. The illustrated system 46 includes a central processing unit (CPU, e.g., main processor) 48 with an integrated memory controller (iMC) 50 that provides access to system memory 52, which could include dual data rate (DDR) synchronous dynamic random access memory (SDRAM, e.g., DDR3 SDRAM JEDEC Standard JESD79-3C, April 2008) modules. The modules of the system memory 52 may be incorporated into a single inline memory module (SIMM), dual inline memory module (DIMM), small outline DIMM (SODIMM), and so on. The CPU 48 may also have one or more drivers 54 and/or processor cores (not shown), where each core may be fully functional with instruction fetch units, instruction decoders, level one (L1) cache, execution units, and so on. The CPU 48 could alternatively communicate with an off-chip variation of the iMC 50, also known as a Northbridge, via a front side bus or a point-to-point fabric that interconnects each of the components in the system 46. The CPU 48 may also execute an operating system (OS) 56 such as a Microsoft Windows, Linux, or Mac (Macintosh) OS.

The illustrated CPU 48 communicates with a platform controller hub (PCH) 58, also known as a Southbridge, via a hub bus. The iMC 50/CPU 48 and the PCH 58 are sometimes referred to as a chipset. The CPU 48 may also be operatively connected to a network (not shown) via a network port through the PCH 58 and various other controllers 60. Thus, the other controllers 60 could provide off-platform communication functionality for a wide variety of purposes such as cellular telephone (e.g., W-CDMA (UMTS), CDMA2000 (IS-856/IS-2000), etc.), WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes. The other controllers 60 could also communicate with the PCH 58 to provide support for user interface devices such as a display, keypad, mouse, etc. in order to allow a user to interact with and perceive information from the system 46.

The PCH 58 may also have internal controllers such as USB (Universal Serial Bus, e.g., USB Specification 2.0, USB Implementers Forum), Serial ATA (SATA, e.g., SATA Rev. 3.0 Specification, May 27, 2009, SATA International Organization/SATA-IO), High Definition Audio, and other controllers. The illustrated PCH 58 is also coupled to storage, which may include a hard drive 62, read only memory (ROM), optical disk, flash memory (not shown), etc.

The illustrated system 46 also includes a dedicated graphics processing unit (GPU) 64 coupled to a dedicated graphics memory 66. The dedicated graphics memory 66 could include GDDR (graphics DDR) or DDR SDRAM modules, or any other memory technology suitable for supporting graphics rendering. The GPU 64 and graphics memory 66 might be installed on a graphics/video card, wherein the GPU 64 could communicate with the CPU 48 via a graphics bus such as a PCI Express Graphics (PEG, e.g., Peripheral Components Interconnect/PCI Express x16 Graphics 150W-ATX Specification 1.0, PCI Special Interest Group) bus, or Accelerated Graphics Port (e.g., AGP V3.0 Interface Specification, September 2002) bus. The graphics card may be integrated onto the system motherboard, into the main CPU 48 die, configured as a discrete card on the motherboard, etc.

The illustrated GPU 64 executes a software module 68 (e.g., user space code) as part of a graphics application such as a 3D (3-dimensional) computer game, flight simulator, or other 3D imaging system, wherein the graphics application may often use virtual calls in a SIMD environment to conduct real-time rendering of various graphical scenes. The illustrated software module 68, which might be written in an object-oriented language such as C++, includes a compiler 70 capable of detecting a runtime virtual call of a function and using a single dispatch of the function to invoke the virtual call for two or more channels of the virtual call, as already discussed. In particular, the compiler 70 could determine that the two or more channels share a common target address, and conduct the single dispatch of the function with respect to the common target address. Simply put, the illustrated approach may minimize the number of dynamic dispatches that are executed for a multi-target virtual call. Accordingly, the illustrated approach can have substantially less performance overhead than conventional approaches.

The software module 68 might also include code for pixel shading and other tasks. The GPU 64 may also include one or more drivers 72, a cache 74, and a rendering module such as a texture unit 76 that could include logic for vertex processing, texture application, rasterization, etc., to enhance and/or support graphics performance. Thus, the illustrated approach can be particularly beneficial in a graphics environment that involves a high level of data parallelism and processing complexity.

Embodiments of the present invention are applicable for use with all types of semiconductor integrated circuit ("IC") chips. Examples of these IC chips include but are not limited to processors, controllers, chipset components, programmable logic arrays (PLA), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:
   detecting a virtual call of a function;
   identifying only a first bit of a set of bits of a status register by a value that indicates the virtual call has not yet been executed, wherein each bit of the set of bits corresponds to one channel of a set of channels that execute the virtual call;
   determining that two or more channels of the set of channels share a common target address based on an identification, based on the first bit of the status register, of a target address of a function implementation invoked by one channel of the two or more channels and an identification, based on the identification of the target address, of each remaining channel of the two or more channels that utilize the same target address; and
   conducting a single dispatch of the function with respect to the common target address to execute the virtual call by the two or more channels to invoke the function implementation, wherein only each bit of the set of bits that corresponds to one channel of the two or more channels that share the common target address is changed in the status register, before identification of only a next first bit of the set of bits of the status register, to a value that indicates the virtual call has been executed by the two or more channels.

2. The method of claim 1, further including:
   initializing the status register based on an address register containing function address data associated with the virtual call;
   identifying the common target address based on the status register; and
   updating the status register based on the single dispatch of the function.

3. The method of claim 1, further including:
   populating a flag register based on the two or more channels that share the common target address; and
   masking an invocation instruction based on the flag register to conduct the single dispatch of the function with respect to the common target address, wherein masking the invocation instruction causes the virtual call to be executed only by the two or more channels to invoke the function implementation.

4. The method of claim 1, further including using a second single dispatch of the function to execute the virtual call by two or more additional channels that share one other common target address to invoke one other function implementation, wherein only each bit of the set of bits that corresponds to one channel of the two or more additional channels that share the one other common address is changed in the status register, before identification of only another next first bit of the set of bits of the status register, to a value that indicates the virtual call has been executed by the two or more additional channels.

5. The method of claim 1, wherein the virtual call is a single instruction multiple data (SIMD) call.

6. The method of claim 1, wherein the virtual call is detected at runtime.

7. The method of claim 1, wherein the value that indicates the virtual call has not yet been executed includes a first binary value that always indicates the virtual call has not yet been executed, and wherein the value that indicates the virtual call has been executed includes a second binary value, opposite the first binary value, that always indicates the virtual call has been executed.

8. The method of claim 7, wherein the first binary value is a non-zero value and the second binary value is zero, wherein the identification of each remaining channel of the two or more channels includes finding all channels of the set of channels that utilize the same target address as the one channel of the two or more channels, and wherein only each bit of the set of bits that corresponds to one channel of the two or more channels is changed to a value of zero in the status register, before identification of only the next first bit of the set of bits, to indicate the virtual call has been executed by the two or more channels.

9. The method of claim 1, further including:
implementing an intermediate parameter to point to a bit of an address register that holds the target address for the one channel of the two or more channels; and
implementing a flag register including a set of bits, wherein each bit of the set of bits of the flag register corresponds to one channel of the set of channels that execute the virtual call, and wherein only each bit of the set of bits of the flag register that corresponds to one channel of the two or more channels is set to a value that indicates only the two or more channels that share the common target address are to be active to execute the virtual call.

10. The method of claim 9, further including:
setting a specified binary value in the flag register only for each bit of the set of bits of the flag register that corresponds to the two or more channels that always indicates the two or more channels share the common target address and are to be active to execute the virtual call, and
setting another specified binary value in the flag register opposite the specified binary value only for each bit of the set of bits of the flag register that corresponds to two or more additional channels that always indicates the two or more additional channels do not share the common target address and are not to be active to execute the virtual call.

11. A non-transitory computer readable storage medium comprising a set of instructions which, when executed by a processor, cause a computer to:
detect a virtual call of a function;
identify only a first bit of a set of bits of a status register by a value that is to indicate the virtual call has not yet been executed, wherein each bit of the set of bits corresponds to one channel of a set of channels that execute the virtual call;
determine that two or more channels of the set of channels share a common target address based on an identification, based on the first bit of the status register, of a target address of a function implementation to be invoked by one channel of the two or more channels and an identification, based on the identification of the target address, of each remaining channel of the two or more channels that utilize the same target address; and
conduct a single dispatch of the function with respect to the common target address to execute the virtual call by the two or more channels to invoke the function implementation, wherein only each bit of the set of bits that corresponds to one channel of the two or more channels that share the common target address is to be changed in the status register, before identification of only a next first bit of the set of bits of the status register, to a value that is to indicate the virtual call has been executed.

12. The medium of claim 11, wherein, when executed, the instructions cause a computer to:
initialize the status register based on an address register containing function address data associated with the virtual call;
identify the common target address based on the status register; and
update the status register based on the single dispatch of the function.

13. The medium of claim 11, wherein, when executed, the instructions cause a computer to:
populate a flag register based on the two or more channels that share the common target address; and
mask an invocation instruction based on the flag register to conduct the single dispatch of the function with respect to the common target address, wherein to mask the invocation instruction is to cause the virtual call to be executed only by the two or more channels to invoke the function implementation.

14. The medium of claim 11, wherein, when executed, the instructions cause a computer to use a second single dispatch of the function to execute the virtual call by two or more additional channels that share one other common target address to invoke one other function implementation, wherein only each bit of the set of bits that corresponds to one channel of the two or more additional channels that share the one other common address is to be changed in the status register, before identification of only another next first bit of the set of bits of the status register, to a value that is to indicate the virtual call has been executed by the two or more additional channels.

15. The medium of claim 11, wherein the virtual call is to be a single instruction multiple data (SIMD) call.

16. The medium of claim 11, wherein the virtual call is to be detected at runtime.

17. An apparatus comprising:
a processor, and
a non-transitory computer readable storage medium including a set of instructions which, when executed by the processor, cause the apparatus to,
detect a virtual call of a function,
identify only a first bit of a set of bits of a status register by a value that is to indicate the virtual call has not yet been executed, wherein each bit of the set of bits corresponds to one channel of a set of channels that execute the virtual call,
determine that two or more channels of the set of channels share a common target address based on an identification, based on the first bit of the status register, of a target address of a function implementation to be invoked by one channel of the two or more channels and an identification, based on the identification of the target address, of each remaining channel of the two or more channels that utilize the same target address, and
conduct a single dispatch of the function with respect to the common target address to execute the virtual call by the two or more channels to invoke the function implementation, wherein only each bit of the set of bits that corresponds to one channel of the two or more channels that share the common target address is to be changed in the status register, before identification of only a next first bit of the set of bits of the status register, to a value that is to indicate the virtual call has been executed.

18. The apparatus of claim 17, wherein, when executed, the instructions cause the apparatus to,
initialize the status register based on an address register containing function address data associated with the virtual call,
identify the common target address based on the status register, and
update the status register based on the single dispatch of the function.

19. The apparatus of claim 17, wherein, when executed, the instructions cause the apparatus to,
populate a flag register based on the two or more channels that share the common target address, and mask an invocation instruction based on the flag register, to conduct the single dispatch of the function with respect to the common target address, wherein to mask the invocation instruction is to cause the virtual call to be executed only by the two or more channels to invoke the function implementation.

20. The apparatus of claim 17, wherein, when executed, the instructions cause the apparatus to use a second single dispatch of the function to execute the virtual call by two or more additional channels that share one other common target address to invoke one other function implementation, wherein only each bit of the set of bits that corresponds to one channel of the two or more additional channels that share the one other common address is to be changed in the status register, before identification of only another next first bit of the set of bits of the status register, to a value that is to indicate the virtual call has been executed by the two or more additional channels.

21. The apparatus of claim 17, wherein the virtual call is to be a single instruction multiple data (SIMD) call.

22. The apparatus of claim 17, wherein the virtual call is to be detected at runtime.

23. The apparatus of claim 17, wherein the processor includes a dedicated graphics processor.

24. A system comprising:
a main processor,
a secondary processor coupled to the main processor, and
a non-transitory computer readable storage medium including a set of instructions which, when executed by the secondary processor, cause the system to,
detect a virtual call of a function,
identify only a first bit of a set of bits of a status register by a value that is to indicate the virtual call has not yet been executed, wherein each bit of the set of bits corresponds to one channel of a set of channels that execute the virtual call;
determine that two or more channels of the set of channels share a common target address based on an identification, based on the first bit of the status register, of a target address of a function implementation to be invoked by one channel of the two or more channels and an identification, based on the identification of the target address, of each remaining channel of the two or more channels that utilize the same target address, and
conduct a single dispatch of the function with respect to the common target address to execute the virtual call by the two or more channels to invoke the function implementation, wherein only each bit of the set of bits that corresponds to one channel of the two or more channels that share the common target address is to be changed in the status register, before identification of only a next first bit of the set of bits of the status register, to a value that is to indicate the virtual call has been executed by the two or more channels.

25. The system of claim 24, wherein, when executed, the instructions cause the system to,
initialize the status register based on an address register containing function address data associated with the virtual call,
identify the common target address based on the status register, and
update the status register based on the single dispatch of the function.

26. The system of claim 24, wherein, when executed, the instructions cause the system to,
populate a flag register based on the two or more channels that share the common target address, and
mask an invocation instruction based on the flag register to conduct the single dispatch of the function with respect to the common target address, wherein to mask the invocation instruction is to cause the virtual call to be executed only by the two or more channels to invoke the function implementation.

27. The system of claim 24, wherein, when executed, the instructions cause the system to use a second single dispatch of the function to execute the virtual call by two or more additional channels that share one other common target address to invoke one other function implementation, wherein only each bit of the set of bits that corresponds to one channel of the two or more additional channels that share the one other common address is to be changed in the status register, before identification of only another next first bit of the set of bits of the status register, to a value that is to indicate the virtual call has been executed by the two or more additional channels.

28. The system of claim 24, wherein the virtual call is to be a single instruction multiple data (SIMD) call.

29. The system of claim 24, wherein the virtual call is to be detected at runtime.

30. The system of claim 24, wherein the secondary processor includes a dedicated graphics processor.

* * * * *